United States Patent
Hara et al.

(10) Patent No.: US 9,999,904 B2
(45) Date of Patent: *Jun. 19, 2018

(54) COATED METAL PLATE AND EXTERIOR BUILDING MATERIAL

(71) Applicant: NISSHIN STEEL CO., LTD., Tokyo (JP)

(72) Inventors: Taketo Hara, Chiba (JP); Hirokazu Yano, Chiba (JP); Kenji Sakato, Chiba (JP); Kazuhiko Takahashi, Chiba (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/128,260

(22) PCT Filed: Mar. 26, 2014

(86) PCT No.: PCT/JP2014/001743
§ 371 (c)(1),
(2) Date: Sep. 22, 2016

(87) PCT Pub. No.: WO2015/145481
PCT Pub. Date: Jan. 10, 2015

(65) Prior Publication Data
US 2017/0100746 A1    Apr. 13, 2017

(30) Foreign Application Priority Data
Mar. 24, 2014  (JP) .................................. 2014-059948

(51) Int. Cl.
*B32B 15/04* (2006.01)
*B32B 15/16* (2006.01)
(Continued)

(52) U.S. Cl.
CPC ............... *B05D 5/06* (2013.01); *B05D 3/002* (2013.01); *B05D 3/0254* (2013.01); *B05D 7/14* (2013.01);
(Continued)

(58) Field of Classification Search
CPC ..... Y10T 428/24355; Y10T 428/24364; Y10T 428/24372; Y10T 428/24388;
(Continued)

(56) References Cited

U.S. PATENT DOCUMENTS 3,748,794 A * 7/1973 Lorenzi ............... E04B 1/34807
52/236.3
2011/0236632 A1 * 9/2011 Hosokawa ............ B05D 5/063
428/141

FOREIGN PATENT DOCUMENTS

EP    1566466 A1    8/2005
JP    5-228433 A    9/1993
(Continued)

OTHER PUBLICATIONS

TAFTIC(TM) ASF series [online], Toyobo AP department, Apr. 10, 2014 (searching date), Product introduction: olyacrylonitrile type particles, Excellent matting agent TAFTIC ASF series <URL;http://www.toyobo.co.jp/seihin/ap/taftic/pan/asf.html>.
(Continued)

*Primary Examiner* — Joanna Pleszcznska
(74) *Attorney, Agent, or Firm* — Brundidge & Stanger, P.C.

(57) ABSTRACT

This coated metal plate is a chromate-free coated metal plate for exterior applications, which comprises a metal plate and a coating film that is arranged on the metal plate. The coating film contains 0.01-15% by volume of porous particles as a gloss control agent. If R (μm) is the number average particle diameter of the gloss control agent, T (μm) is the film
(Continued)

thickness of the coating film, and σ is the standard deviation of the number-based particle size distribution of the gloss control agent, the coated metal plate satisfies the following formulae. $(R+2σ)/T ≤ 0.7$ $R ≥ 2.0$ $9 ≤ T ≤ 19$.

25 Claims, 6 Drawing Sheets

(51) Int. Cl.
  *B32B 15/20* (2006.01)
  *C08K 3/36* (2006.01)
  *C08K 3/40* (2006.01)
  *B05D 5/06* (2006.01)
  *B05D 7/14* (2006.01)
  *B05D 7/00* (2006.01)
  *B05D 3/02* (2006.01)
  *B05D 3/00* (2006.01)
  *C23C 22/34* (2006.01)
  *E04B 1/76* (2006.01)
  *E04B 2/02* (2006.01)
  *E04B 2/90* (2006.01)

(52) U.S. Cl.
  CPC ............... *B05D 7/53* (2013.01); *C23C 22/34* (2013.01); *E04B 1/7675* (2013.01); *E04B 2/02* (2013.01); *E04B 2/90* (2013.01); *E04B 2002/0286* (2013.01); *E04B 2103/06* (2013.01)

(58) Field of Classification Search
  CPC ......... Y10T 428/31678; Y10T 428/259; Y10T 428/265; Y10T 428/25; E04B 2002/0286; E04B 2103/06; B32B 15/04; B32B 15/08; B32B 2307/408; B32B 2307/752; B32B 15/16; B32B 15/20; C08K 3/34; C08K 3/40
  See application file for complete search history.

(56) References Cited

FOREIGN PATENT DOCUMENTS

| | | |
|---|---|---|
| JP | 10-128905 A | 5/1998 |
| JP | 2002-178447 A | 6/2002 |
| JP | 2004-269921 A | 9/2004 |
| JP | 2004244720 A | 9/2004 |
| JP | 2009-233498 A | 10/2009 |
| JP | 2011-148107 A | 8/2011 |
| JP | 2011-207208 A | 10/2011 |
| JP | 2012-082944 A | 4/2012 |
| JP | 2012-214010 A | 11/2012 |
| JP | 2012-214676 A | 11/2012 |
| WO | 2010/071150 A1 | 6/2010 |

OTHER PUBLICATIONS

International Search Report from International Application No. PCT/JP2014/001743 dated Jul. 1, 2014.

J. Wang et al. "The particle size effect of MALPB-DEA dispersions on their anticorrosion performances as waterborne coatings on galvanized sheet." Journal of Coating Technology and Research, vol. 8, No. 1, pp. 11-17, XP-002771605 (Jan. 2011).

Extended European Search Report issued in EP 14887509.9, dated Jul. 10, 2017.

* cited by examiner

100 μm

COATED METAL PLATE AND EXTERIOR BUILDING MATERIAL

TECHNICAL FIELD

The present invention relates to a coated metal sheet for exterior and an exterior building material.

BACKGROUND ART

Coated metal sheets, excellent in versatility, designability, durability and the like, have been used in various applications. In coated metal sheets for exterior building material applications, mainly from the viewpoint of designability, a gloss adjusting agent is usually blended in an overcoat coating film on the surface of the coated metal sheet. Silica is usually used as the gloss adjusting agent in the coated metal sheets for exterior building materials. The particle diameter of the silica is usually specified by an average particle diameter. The average particle diameter of the silica as the gloss adjusting agent in the coated metal sheet is usually from 3 to 30 μm, depending on the color and the application (for example, see PTL 1 (paragraph 0018)).

CITATION LIST

Patent Literature

PTL 1
Japanese Patent Application Laid-Open No. 2011-148107

SUMMARY OF INVENTION

Technical Problem

As coated metal sheets for exterior building materials, chromate-coated steel sheets are used. Efforts have been made to improve the molding processability or the corrosion resistance at cut ends for the chromate-coated steel sheets, which thus have had long-term durability. Meanwhile, strong interest has been shown to environmental preservation in recent years also in the technical field of exterior building materials. Accordingly, legal regulations to ban the use of components that adversely affect or cause a concern about possibility of adversely affecting the environment have been under consideration. For example, total prohibition of the use of hexavalent chromium components, generally used in coated metal sheets as an anti-rust component, in the near future is under consideration. Also for chromate-free coated steel sheets, various considerations have been made such as pre-coating treatment, optimization of anti-rust pigments and the like, and characteristics obtained at molding processed portions and cut ends are comparable to those of the chromate-coated steel sheets.

However, the corrosion resistance of the flat portion in chromate-coated steel sheets did not lead to a large problem, while corrosion in the flat portion in chromate-free coated steel sheets may become severe. Particularly when silica is used in the gloss adjusting agent, corrosion such as stain rust, coating film blistering and the like, in the flat portion has occurred during actual use in some cases, before the intended age of service, as shown in FIG. 1.

An object of the present invention is to provide a coated metal sheet and an exterior building material that are chromate-free as well as have excellent flat-portion corrosion resistance.

Solution to Problem

The present inventors have intensively studied causes of the aforementioned corrosion in the flat portion. FIG. 2 is a micrograph of a corroded portion in the flat portion of a chromate-free coated metal sheet. In FIG. 2, portion A is a portion where silica particles as a gloss adjusting agent are exposed from the overcoat coating film, and portion B is a portion where the silica particles have fallen off from the overcoat coating film. FIG. 3 is a reflection electron micrograph of a cross section along line L, in FIG. 2, in portion A of the coated metal sheet. FIG. 4 is a reflection electron micrograph of a cross section along line L, in FIG. 2, in portion B of the coated metal sheet. FIG. 3 clearly shows the occurrence of cracks at the silica particles exposed on the surface of the overcoat coating film, and FIG. 4 clearly shows that corrosion of the metal sheet originates from the holes in the overcoat coating film from which the silica particles have fallen off.

As described above, the present inventors have confirmed that, when aggregated particles such as silica are used as the gloss adjusting agent, the corrosion occurs in a portion where the gloss adjusting agent in the overcoat coating film has cracked, collapsed, or fallen off, and also that the gloss adjusting agent exposed from the overcoat coating film to be worn in actual use cracks, collapses and falls off the overcoat coating film.

The present inventors have also investigated the gloss adjusting agent to thereby confirm that the silica specified by an average particle diameter contains particles considerably larger than the average particle diameter relative to the thickness of the overcoat coating film. For example, when observing, among commercially available silica to be used in the gloss adjusting agent, silica having an average particle diameter of 3.3 μm with an electron microscope, the present inventors have confirmed that silica having a particle diameter of about 15 μm is contained (FIG. 5).

Then, the present inventors, focusing on the fact that such aggregated particles having a large particle diameter decrease the corrosion resistance, have found that, by use of a gloss adjusting agent having a specific particle diameter relative to the thickness of the overcoat coating film, corrosion resistance can be obtained equivalent to or greater than the corrosion resistance achieved by chromate-based chemical conversion treatment and by use of a chromium-containing anti-rust pigment in an undercoat coating film in conventional metal sheets, having completed the present invention.

More specifically, the present invention relates to a chromate-free coated metal sheet and an exterior building material given below:

[1] A chromate-free coated metal sheet including
  a metal sheet and
  an overcoat coating film to be disposed on the metal sheet,
  wherein the overcoat coating film comprises particles having micropores as a gloss adjusting agent,
  wherein the content of the gloss adjusting agent in the overcoat coating film is 0.01 to 15 vol %, and
  wherein the coated metal sheet satisfies the following expressions:

$(R+2\sigma)/T \leq 0.7$ $R \geq 2.0$ $9 \leq T \leq 19$ wherein R (μm) is the number average particle diameter of the gloss adjusting agent, T (μm) is the film thickness of the overcoat coating film, and σ is the standard deviation of the number particle size distribution of the gloss adjusting agent.

[2] The coated metal sheet according to [1], further including an undercoat coating film between the metal sheet and the overcoat coating film.

[3] The coated metal sheet according to [1] or [2], wherein the coated metal sheet is a coated metal sheet for exterior.

[4] An exterior building material composed of the coated metal sheet according to any one of [1] to [3].

Advantageous Effects of Invention

The present invention prevents exposure, cracking and the like of the gloss adjusting agent during the intended age of service. Accordingly, there is provided a coated metal sheet for exterior, wherein the coated metal sheet is chromate-free as well as has excellent flat-portion corrosion resistance equivalent to or greater than that of coated metal sheets rust-prevented with chromium.

DESCRIPTION OF EMBODIMENTS

Figure 1:
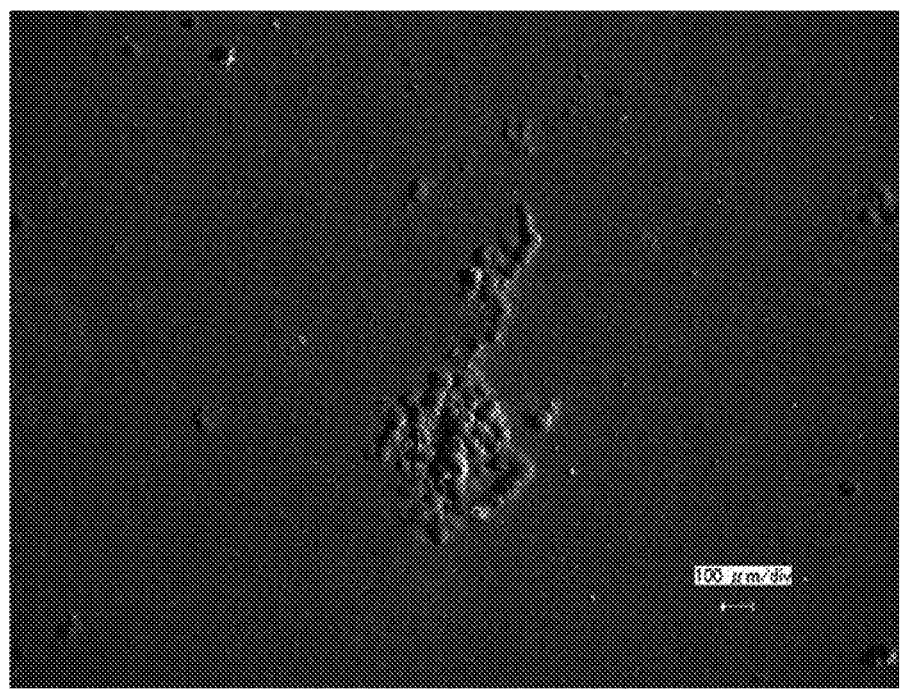
FIG. 1 is a micrograph of a corroded portion (coating film blistering) occurred in the flat portion of a chromate-free coated metal sheet in actual use of five years.
Figure 2:
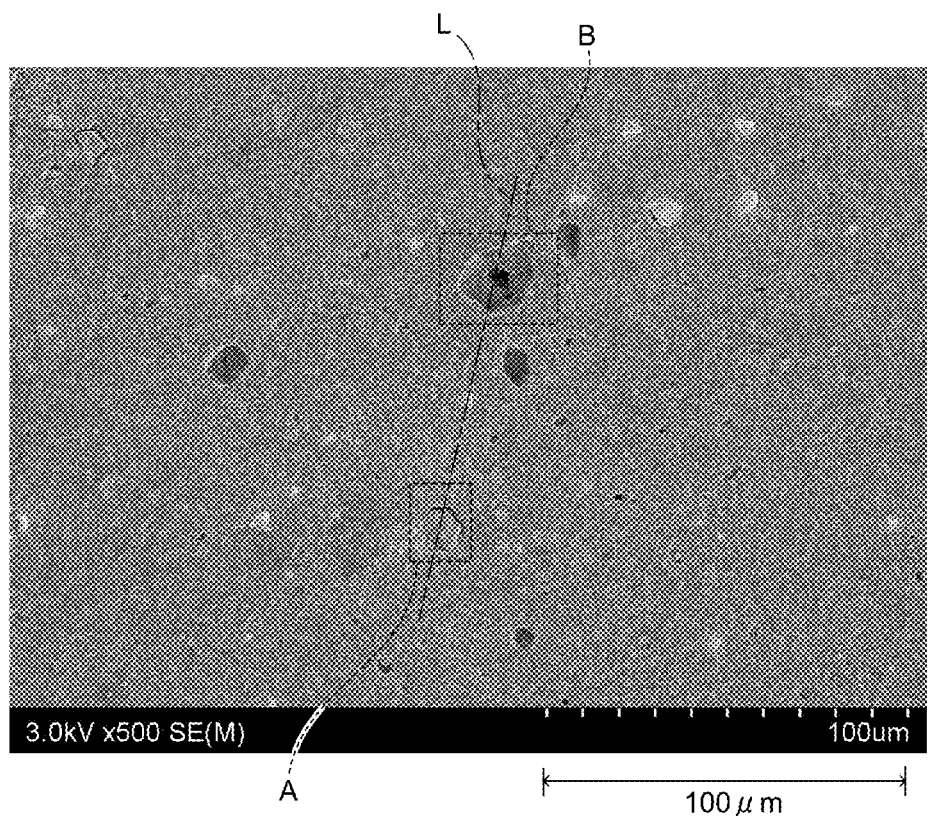
FIG. 2 is a micrograph of a corroded portion in the flat portion of a chromate-free coated metal sheet.
Figure 3:
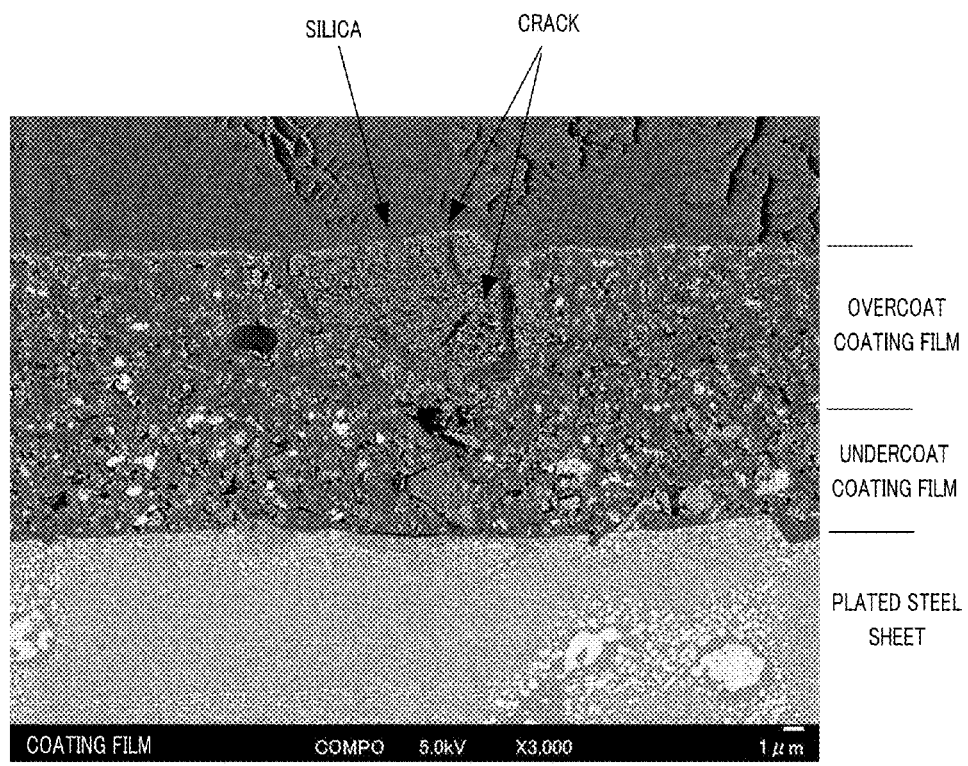
FIG. 3 is a reflection electron micrograph of a cross section along line L, in FIG. 2, in portion A of the coated metal sheet shown in FIG. 2.
Figure 4:
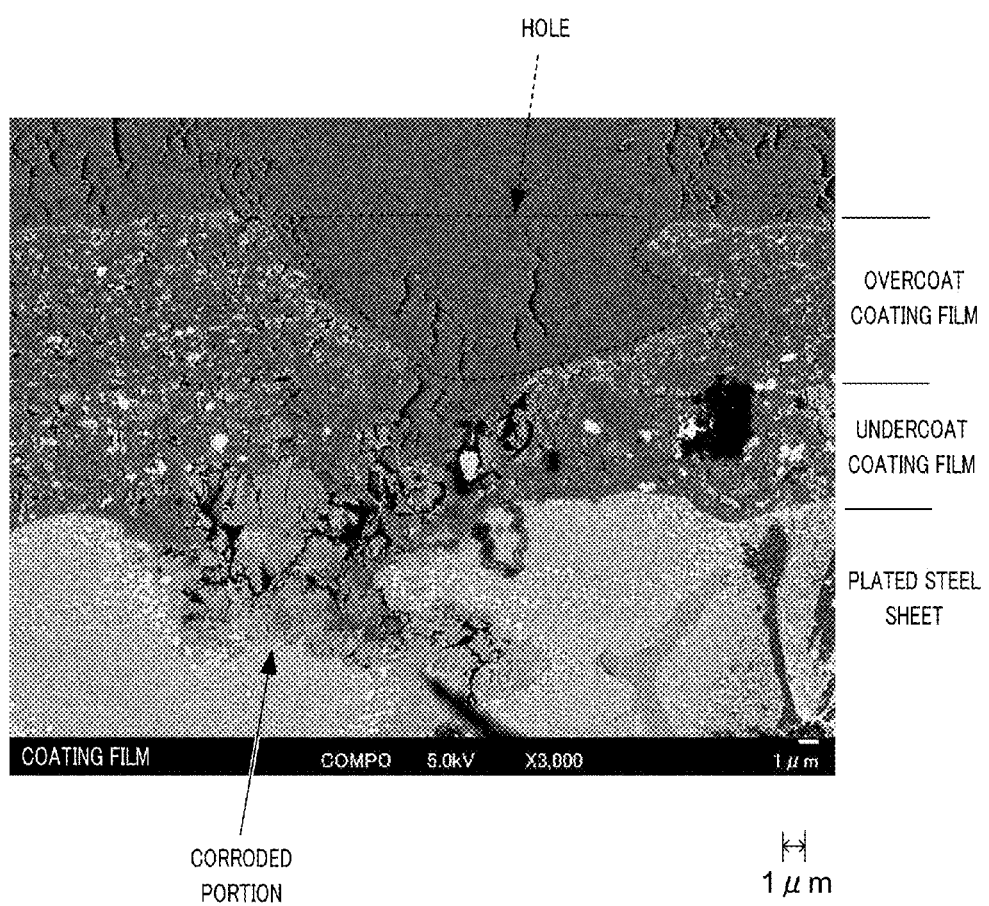
FIG. 4 is a reflection electron micrograph of a cross section along line L, in FIG. 2, in portion B of the coated metal sheet shown in FIG. 2.
Figure 5:
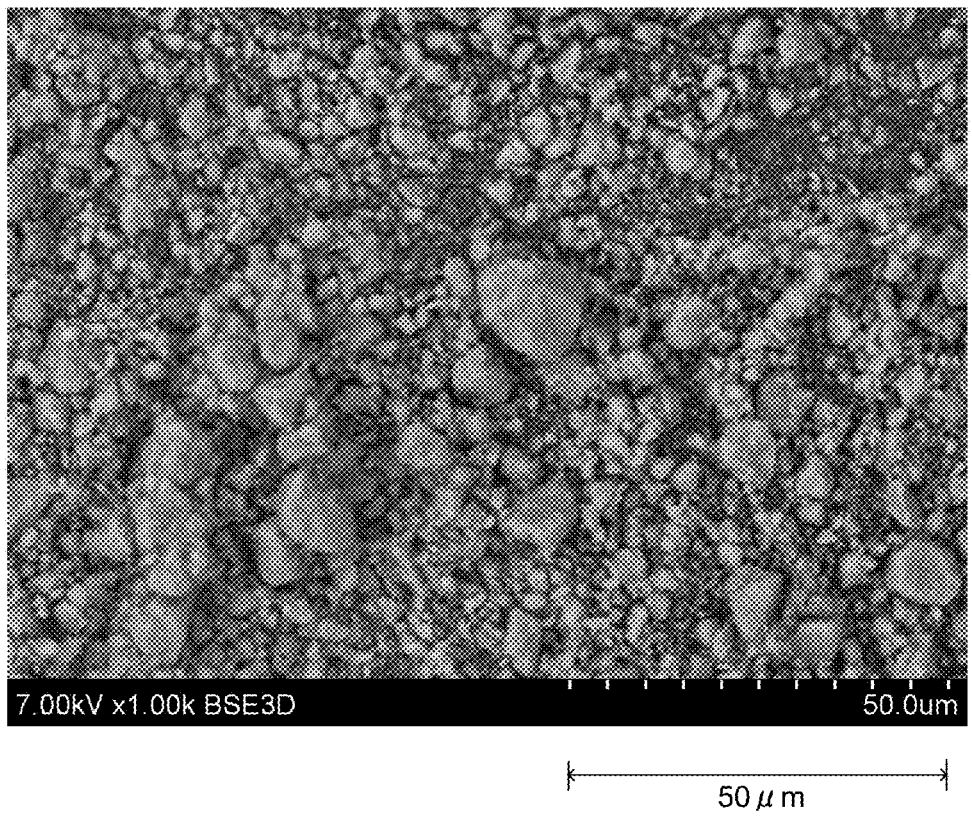
FIG. 5 is an electron micrograph of silica powder having an average particle diameter of 3.3 μm.

Hereinafter, the coated metal sheet according to one embodiment of the present invention will be described. The coated metal sheet includes a metal sheet and an overcoat coating film disposed on the metal sheet.

The metal sheet can be selected from known metal sheets in the range where the effect of the present embodiment can be achieved. Examples of the metal sheet include cold-rolled steel sheets, galvanized steel sheets, Zn—Al alloy-plated steel sheet, Zn—Al—Mg alloy-plated steel sheets, aluminum-plated steel sheets, stainless steel sheets (including austenitic, martensitic, ferritic, and ferrite-martensite two-phase systems), aluminum sheets, aluminum-alloy sheets, copper sheets and the like. It is preferable that the metal sheets are plated steel sheets from the viewpoint of corrosion resistance, lighter weight, and cost-effectiveness. The plated steel sheet is preferably hot-dip 55% Al—Zn alloy-plated steel sheets, Zn—Al—Mg alloy-plated steel sheets, or aluminum-plated steel sheets, particularly from the viewpoint of corrosion resistance and from the viewpoint of suitability for exterior building materials.

The metal sheet preferably has a chemical conversion film on its surface, from the viewpoint of improving the adhesiveness of the coated metal sheet and the corrosion resistance. Examples of the chemical conversion film include Ti—Mo composite films, fluoro acid-based films, phosphate films, resin-based films, resin and silane coupling agent-based films, silica-based films, silica and silane coupling agent-based films, zirconium-based films, and zirconium and silane coupling agent-based films From the above-described viewpoints, the amount of the Ti—Mo composite film deposited is preferably 10 to 500 $mg/m^2$ in terms of total Ti and Mo, the amount of the fluoro acid film deposited is preferably 3 to 100 $mg/m^2$ in terms of fluorine or in terms of total elemental metals, and the amount of the phosphate film deposited is preferably 0.1 to 5 $g/m^2$ in terms of elemental phosphorous, in the metal sheet.

The amount of the resin-based film deposited is preferably 1 to 500 $mg/m^2$ in terms of the resin, the amount of the resin and silane coupling agent-based film deposited is preferably 0.1 to 50 $mg/m^2$ in terms of Si, the amount of the silica-based film deposited is preferably 0.1 to 200 $mg/m^2$ in terms of Si, the amount of the silica and silane coupling agent-based film deposited is preferably 0.1 to 200 $mg/m^2$ in terms of Si, the amount of the zirconium-based film deposited is preferably 0.1 to 100 $mg/m^2$ in terms of Zr, and the amount of the zirconium and silane coupling agent-based film deposited is preferably is 0.1 to 100 $mg/m^2$ in terms of Zr.

The chemical conversion film can be formed by applying an aqueous chemical conversion liquid for forming the film by a known method such as roll-coating, spin-coating, spraying methods and the like, to the surface of the metal sheet and drying the metal sheet after application without water washing. The drying temperature and the drying time for the metal sheet are preferably 60 to 150° C. as the temperature which the metal sheet reaches and 2 to 10 seconds, for example, from the viewpoint of productivity.

The overcoat coating film is usually composed of resin. The resin is selected as appropriate from the viewpoint of designability, weather resistance and the like. Examples of the resin include polyester, acrylic resins, urethane resins, and fluorine resins.

The film thickness T of the overcoat coating film is 9 to 19 μm. An extremely large film thickness T of the overcoat coating film may be responsible for occurrence of defective coating (foaming), reduction in the productivity, increase in the production cost and the like; whereas, with an extremely small film thickness T, the intended designability and the intended flat-portion corrosion resistance may not be achieved. For example, in order to obtain a coated metal sheet that has good productivity, exhibits the intended gloss and coloring, and can be actually used as an exterior building material for at least 10 years, the film thickness T of the overcoat coating film is, for example, preferably 10 μm or more, more preferably 11 μm or more, from the above-described viewpoint. Also due to the above-described reason, the film thickness T of the overcoat coating film is preferably 17 μm or less, more preferably 15 μm or less. The film thickness T of the overcoat coating film is, for example, the average value of distances from the bottom to the surface at a plurality of positions of the overcoat coating film.

The film thickness T of the overcoat coating film is, from the viewpoint of the designability of the coated metal sheet, preferably larger when the color of the overcoat coating film is light, and can be smaller when the color of the overcoat coating film is dark.

Although it depends on the case, for example, when the value L of the overcoat coating film is 70 or less, the film thickness T of the overcoat coating film can be 13 μm or less, and when the value L of the overcoat coating film is more than 80, the film thickness is preferably 15 µm or more.

Alternatively, the film thickness T of the overcoat coating film can be smaller, as the color of the overcoat coating film is closer to the color of the surface of the steel sheet before the overcoat coating film is formed (for example, an undercoat coating film described below), from the viewpoint of the designability of the coated metal sheet. Although it depends on the case, for example, when absolute value ΔL of the difference between the value L of the overcoat coating film and the value L of the color of the surface of the steel sheet before the coating film is formed is 10 or less, the film thickness T of the overcoat coating film can be 11 µm or less, when ΔL is 20 or less, the film thickness T can be 13 µm or less, and when ΔL is 50 or less, the film thickness T can be 15 µm or less.

The value L can be determined by calculation by the Hunter's color difference formula from the measurement result by a commercially available spectrophotometer (for example, manufactured by KONICA MINOLTA OPTICS, INC. "CM3700d").

The overcoat coating film contains a gloss adjusting agent. The gloss adjusting agent is blended in the overcoat coating film to moderately roughen the surface of the overcoat coating film, imparting the intended appearance with gloss to the coated metal sheet. The gloss adjusting agent is also used to adjust variation of gloss among production lots.

The gloss adjusting agent has a number average particle diameter R of 2.0 µm or more. When the gloss adjusting agent is extremely small, the gloss of the overcoat coating film is extremely high, and thus, the intended designability may not be achieved. As such, it is possible to determine the number average particle diameter R of the gloss adjusting agent as appropriate depending on the intended designability (glossiness) of the coated metal sheet in the range where R satisfies the expression described below. However, when R is extremely large, the gloss of the overcoat coating film is extremely low, and thus the intended designability cannot be achieved. For example, in order to obtain a coated metal sheet having a glossiness at 60 degrees of 20 to 85 in addition to the flat-portion corrosion resistance, the number average particle diameter R of the gloss adjusting agent is 3 µm or more, 5 µm or more, or 7 µm or more. The number average particle diameter can be confirmed by observation of the cross-section of the overcoat coating film or can be measured by an image analyzing method and the Coulter method (for example, using an accurate particle sizing and counting analyzer "Multisizer 4" manufactured by Beckman Coulter Inc.).

The content of the gloss adjusting agent in the overcoat coating film is 0.01 to 15 vol %. When the content is extremely high, the gloss of the overcoat coating film becomes extremely low, and also, the processed-part adhesiveness decreases. When the content is extremely low, the gloss cannot be controlled. Thus, even if the content is extremely large or small, the intended designability may not be achieved. For example, in order to obtain a coated metal sheet having a glossiness at 60 degrees of 20 to 85, the content of the gloss adjusting agent in the overcoat coating film is preferably 0.05 vol % or more, more preferably 0.1 vol % or more. Also due to the above-described reason, the content of the gloss adjusting agent in the overcoat coating film is preferably 13 vol % or less, more preferably 10 vol % or less. The content can be confirmed by measurement of the ash content in the overcoat coating film, collection of the gloss adjusting agent by dissolution of the overcoat coating film, image analysis of a cross-sectional image of element discrimination conducted at a plurality of points or the like.

The gloss adjusting agent is particles having micropores (hereinafter, may be referred to as "microporous particles"). Examples of the microporous particles include aggregates formed by chemical bonding of primary particles, agglomerates formed by physical bonding of primary particles, and porous particles. The porous particles have a porous structure at least inside each of the particles. The gloss adjusting agent may be composed solely of the microporous particles or may contain particles other than microporous particles. The microporous particles may be inorganic particles or organic particles, and can be selected from known microporous particles used as a gloss adjusting agent, in the range where the particles satisfy the expression described below. Specific examples of the materials of the microporous particles include silica, calcium carbonate, barium sulfate, polyacrylonitrile, and calcium carbonate-calcium phosphate composites.

The coated metal sheet satisfies the following expression:

$$(R+2\sigma)/T \leq 0.7$$

wherein R (µm) is the number average particle diameter of the gloss adjusting agent, T (µm) is the film thickness of the overcoat coating film, and σ is the standard deviation of the number particle size distribution of the gloss adjusting agent.

When the number particle size distribution of the gloss adjusting agent is the normal distribution, $R+2\sigma$ represents the maximum value of the particle diameter of about 95.45% of the particles having a particle diameter larger than the number average particle diameter R. In this manner, $R+2\sigma$ represents the substantially maximum value of the particle diameter of the gloss adjusting agent. With extremely large $(R+2\sigma)/T$, the intended flat-portion corrosion resistance may not be achieved when the microporous particles is exposed due to wearing of the overcoat coating film during actual use. With extremely small $(R+2\sigma)/T$, the intended glossiness may not be achieved. For example, in order to obtain a coated metal sheet having an actual age of service as an exterior building material of at least 10 years or more and a glossiness at 60 degrees of 20 to 85, $(R+2\sigma)/T$ is preferably 0.3 or more, more preferably 0.4 or more. Also, due to the above-described reason, $(R+2\sigma)/T$ is preferably 0.6 or less, more preferably 0.5 or less. R and σ can be determined from the number particle size distribution of the gloss adjusting agent.

The gloss adjusting agent may be composed of sufficiently small particles relative to the film thickness T of the overcoat coating film when in the range satisfying the above-described expression. From the viewpoint of preventing early exposure of the gloss adjusting agent from the overcoat coating film, the maximum value of the particle diameter in the number particle size distribution of the gloss adjusting agent is preferably less than the film thickness of the overcoat coating film T, more preferably 0.7 T or less, still more preferably 0.6 T or less. The gloss adjusting agent having the particle size distribution including the maximum value can be selected from commercially-available products, or can be adjusted by the following classification or the like.

The gloss adjusting agent may be subjected to classification to sharpen the particle size distribution of the gloss adjusting agent, treatment to remove coarse particles in the gloss adjusting agent or the like, from the viewpoint of preventing wearing by its exposure from the overcoat coating film during actual use of the exterior building material. The classification is conducted with, for example, a sieve, a forced vortex-type centrifugal precision air classifier or the like. Treatment for cutting the coarse particles can be conducted by a known method to separate and remove the coarse particles having a particle diameter of 0.3 T to 0.7 T, or a known method to pulverize the coarse particles.

The overcoat coating film may further contain other ingredients besides the resin and gloss adjusting agent aforementioned, in the range where the effect of the present embodiment can be achieved. For example, the overcoat coating film may further contain a colorant. Examples of the colorant include inorganic pigments such as titanium oxide, calcium carbonate, carbon black, iron black, iron oxide yellow, titanium yellow, colcothar, iron blue, cobalt blue, cerulean blue, ultramarine blue, cobalt green, molybdenum red and the like; composite oxide calcined pigments containing metal components such as CoAl, CoCrAl, CoCrZn-MgAl, CoNiZnTi, CoCrZnTi, NiSbTi, CrSbTi, FeCrZnNi, MnSbTi, FeCr, FeCrNi, FeNi, FeCrNiMn, CoCr, Mn, Co, SnZnTi and the like; metallic pigments such as Al flakes, resin-coated Al flakes, Ni flakes, stainless flakes and the like; and organic pigments such as Quinacridone Red, Lithol Red B, Brilliant Scarlet G, Pigment Scarlet 3B, Brilliant Carmine 6B, Lake Red C, Lake Red D, Permanent Red 4R, Bordeaux 10B, Fast Yellow G, Fast Yellow 10G, Pare Red, Watching Red, Benzidine Yellow, Benzidine Orange, Bon Maroon L, Bon Maroon M, Brilliant Fast Scarlet, Vermilion Red, Phthalocyanine Blue, Phthalocyanine Green, Fast Skyblue, Aniline Black and the like. The colorant is sufficiently smaller relative to the gloss adjusting agent, and, for example, the number average particle diameter of the colorant is 0.01 to 1.5 μm. The content of the colorant in the overcoat coating film is, for example, 2 to 20 vol %.

The overcoat coating film may further contain an extender pigment. Examples of the extender pigment include barium sulfate, titanium oxide and the like. The extender pigment is sufficiently smaller relative to the gloss adjusting agent, and, for example, the number average particle diameter of the extender pigment is 0.01 to 1 μm. The content of the extender pigment in the overcoat coating film is, for example, 0.1 to 15 vol %.

The overcoat coating film may further contain a lubricant, from the viewpoint of preventing the occurrence of galling in the overcoat coating film on processing the coated metal sheet. Example of the lubricant include organic waxes such as fluorine-based wax, polyethylene-based wax, styrene-based wax, polypropylene-based wax and the like, and inorganic lubricants such as molybdenum disulfide, talc and the like. The content of the lubricant in the overcoat coating film is, for example, 0 to 10 vol %.

The overcoat coating film is produced by a known method that includes applying a coating material for overcoat coating films to the surface of the metal sheet, the surface of the undercoat coating film described below or the like, drying the coating material, and curing the coating material as required. The coating material for overcoat coating films contains materials for the overcoat coating film aforementioned, and may further contain other ingredients besides the materials in the range where the effect of the present embodiment can be achieved.

For example, the coating material for overcoat coating films may further contain a curing agent. The curing agent crosslinks the polyester or acrylic resin aforementioned on curing (baking) when the overcoat coating film is produced. The type of the curing agent can be selected from the crosslinking agent aforementioned and known curing agents as appropriate, depending on the type of the resin to be used, baking conditions and the like.

Examples of the curing agent include melamine compounds, isocyanate compounds, combinations of a melamine compound and an isocyanate compound and the like. Examples of the melamine compound include imino group-type, methylol-imino group-type, methylol group-type, or complete alkyl group-type melamine compounds. The isocyanate compound may be any of aromatic, aliphatic, and alicyclic compounds, and examples include m-xylene diisocyanate, hexamethylene diisocyanate, naphthalene diisocyanate, isophorone diisocyanate, and block compounds of these.

The overcoat coating film may further contain a curing catalyst as appropriate in the range where the storage stability of the coating material for overcoat coating films is not affected. The content of the curing agent in the overcoat coating film is for example, 10 to 30 vol %.

The overcoat coating film may also contain 10 vol % or less of an ultraviolet absorber (UVA) and a light stabilizer (HALS) as appropriate in order to further improve the weather resistance. Furthermore, the overcoat coating film may contain a hydrophilizing agent, for example, 30 vol % or more of a partially hydrolyzed condensate of tetraalkoxysilane for prevention of rain streak stains.

The coating material for overcoat coating films is prepared by, for example, dispersing the materials for the overcoat coating film aforementioned in a solvent. The coating material may contain a solvent, a crosslinking agent and the like. Examples of the solvent include hydrocarbons such as toluene, xylene and the like; esters such as ethyl acetate, butyl acetate and the like; ethers such as cellosolve and the like; and ketones such as methyl isobutyl ketone, methyl ethyl ketone, isophorone, cyclohexanone and the like.

The coating material for overcoat coating films is applied, for example, by a known method such as roll coating, curtain flow coating, spray coating, immersion coating and the like. The overcoat coating film is produced by heating a metal sheet to which a coating material for overcoat coating film has been applied such that the temperature of the metal sheet reaches 200 to 250° C. thereby baking the coating material for overcoat coating films onto the metal sheet. The film thickness T of the overcoat coating film is adjusted as appropriate, depending on, for example, the amount of the coating material coated.

The coated metal sheet may have further components, in the range where the effect of the present embodiment can be exerted. For example, the coated metal sheet preferably further has an undercoat coating film between the metal sheet and the overcoat coating film, from the viewpoint of improving the adhesiveness and the corrosion resistance of the overcoat coating film in the coated metal sheet. The undercoat coating film is disposed on the surface of the metal sheet, or, when the chemical conversion film has been made, on the surface of the chemical conversion film.

The undercoat coating film is composed of resin. Examples of the resin include epoxy resin, polyester, epoxy-modified polyester resin, acrylic resin, and phenoxy resin.

The undercoat coating film may further contain an anti-rust pigment, a coloring pigment, a metallic pigment or the like. Examples of the anti-rust pigment include non-chromium-based anti-rust pigments such as modified silica, vanadates, magnesium hydrogenphosphate, magnesium phosphate, zinc phosphate, aluminum polyphosphate and the like. Examples of the coloring pigment include titanium oxide, carbon black, chromium oxide, iron oxide, colcothar, titanium yellow, cobalt blue, cobalt green, Aniline Black, and Phthalocyanine Blue. Example of the metallic pigment include aluminum flakes (non-leafing type), bronze flakes, copper flakes, stainless steel flakes, and nickel flakes. Examples of the extender pigment include barium sulfate, titanium oxide, silica, and calcium carbonate.

The content of the pigment in the undercoat coating film can be determined as appropriate, in the range where the effect of the present embodiment can be achieved. For example, the content of the anti-rust pigment in the undercoat coating film is preferably, for example, 10 to 70 vol %.

The undercoat coating film is produced by application of a coating material for undercoat coating films. The coating material may contain a solvent, a crosslinking agent and the like. Examples of the solvent include hydrocarbons such as toluene xylene and the like; esters such as ethyl acetate, butyl acetate and the like; ethers such as cellosolve and the like; and ketones such as methyl isobutyl ketone, methyl ethyl ketone, isophorone, cyclohexanone and the like. Examples of the crosslinking agent include melamine resin, isocyanate resin and the like for crosslinking the resin aforementioned. The coating material for undercoat coating films is prepared by homogeneously mixing and dispersing the materials aforementioned.

The coating material for undercoat coating films is, for example, applied by a known method such as roll coating, curtain flow coating, spray coating, immersion coating or the like to a metal sheet in an amount to be coated such that a dry film thickness of 1 to 10 μm, preferably 3 to 7 μm is obtained. A coating film of the coating material is produced by heating a metal sheet at, for example, 180 to 240° C., a temperature which the metal sheet achieves, thereby baking the film onto the metal sheet.

Figure 6A:
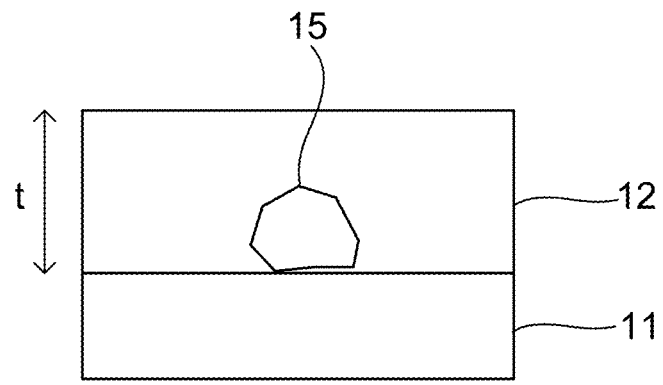
FIG. 6A is a schematic diagram illustrating a cross section of the coated metal sheet immediately after a coating material for overcoat coating films was applied to the sheet.
Figure 6B:
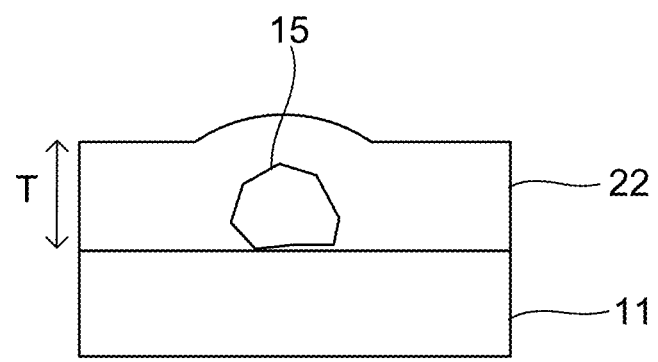
FIG. 6B is a schematic diagram illustrating the cross section of the coated metal sheet after the coating material was baked onto the sheet.

FIG. 6A is a schematic diagram illustrating a cross section of the coated metal sheet immediately after a coating material for overcoat coating films was applied to the sheet. FIG. 6B is a schematic diagram illustrating the cross section of the coated metal sheet after the coating material was baked onto the sheet. As shown in FIGS. 6A and 6B, under a condition where a coating material for overcoat coating films is applied to a base steel sheet 11 (for example, a plated steel sheet or a plated steel sheet and an undercoat coating film), gloss adjusting agent 15 does not substantially affect the surface state of coating film 12 of the coating material. Thus, the intended gloss is not usually exhibited before baking of the coating material. Meanwhile, after baking of the coating material, the volatile components in the coating material are volatilized, and the film thickness T of overcoat coating film 22 becomes smaller than the thickness t of coating film 12. Thus, protrusions are formed on the surface of overcoat coating film 22 by gloss adjusting agent 15, and overcoat coating film 22 exhibits the intended gloss (enamel-like gloss in the present invention).

The coated metal sheet according to the present embodiment is a chromate-free coated metal sheet. "Chromate-free" means that the coated metal sheet contains substantially no hexavalent chromium. It is possible to confirm that the coated metal sheet is "chromate-free" as follows. For example, in any of the metal sheet, the chemical conversion film, the undercoat coating film, and the overcoat coating film aforementioned, four 50 mm×50 mm specimens are cut off from a metal sheet on which the overcoat coating film or the undercoat coating film has been produced singly, and the specimens are immersed in 100 mL of boiling pure water for 10 minutes. Then, when hexavalent chromium eluted in pure water is quantified by a concentration analysis method in compliance with JIS H8625, Annex 2.4.1, "Diphenylcarbazide Visual Colorimetric Method", the concentration shall be lower than the detection limit. The coated metal sheet does not elute hexavalent chromium during actual use into the environment, and exhibits sufficient corrosion resistance at its flat portion. Incidentally, a "flat portion" refers to a portion that is covered with the overcoat coating film of the metal sheet and has not been deformed by bending, drawing, bulging, embossing, roll-forming or the like.

Applications of the coated metal sheet are suitable for exterior. "For exterior" refers to being used in portions exposed to the open air such as roofs, walls, accessories, signboards, outdoor-installed apparatuses and the like, wherein the portions may be irradiated with a sunbeam and its reflected light. Examples of the coated metal sheet for exterior include coated metal sheets for exterior building materials and the like.

The coated metal sheet is suitable for a coated metal sheet having enamel gloss. Enamel gloss refers to glossiness at 60° being 20 to 85. When the glossiness is extremely low, a matte appearance becomes predominant, and enamel-like gloss may not be achieved. When the glossiness is extremely high, the glossiness cannot be controlled, and the reproducibility of the coating appearance cannot be obtained. The glossiness is adjusted with the average particle diameter of the gloss adjusting agent, its content in the overcoat coating film, and the like.

It is preferable that the coated metal sheet does not contain particles having a particle diameter larger than that of the gloss adjusting agent from the viewpoint of attaining the intended designability, such as the enamel gloss.

In the coated metal sheet, the gloss adjusting agent (microporous particles) are included completely in the overcoat coating film. Also, the substantially maximum particle of the microporous particles is sufficiently smaller relative to the film thickness of the overcoat coating film. Thus, the overcoat coating film can be designed such that the microporous particles are not exposed within the intended age of service, even if the resin in the overcoat coating film is gradually worn from the surface of the overcoat coating film by actual use in an exterior application. Therefore, cracking and collapse of the microporous particles and fall-off from the overcoat coating film within the intended age of service are prevented, and corrosive factors such as rainwater and the like cannot reach the metal sheet during the intended age of service. Thus, the coated metal sheet is chromate-free as well as exhibits flat-portion corrosion resistance equivalent to or greater than that of coated metal sheets containing a chromate-based anti-rust component.

As clear from the above description, according to the present embodiment, there can be provided a coated metal sheet that is chromate-free as well as has excellent flat-portion corrosion resistance, wherein the coated metal sheet has a metal sheet and an overcoat coating film to be disposed on the metal sheet, wherein the overcoat coating film contains particles having micropores (microporous particles) as a gloss adjusting agent, wherein the content of the gloss adjusting agent in the overcoat coating film is 0.01 to 15 vol % and wherein the following expressions are satisfied:

$$(R+2\sigma)/T \leq 0.7$$

$$R \geq 2.0$$

$$9 \leq T \leq 19$$

wherein R (μm) is the number average particle diameter of the gloss adjusting agent, T (μm) is the film thickness of the overcoat coating film, and σ is the standard deviation of the number particle size distribution of the gloss adjusting agent.

Additionally, that the coated metal sheet further has an undercoat coating film between the metal sheet and the overcoat coating film is further effective from the viewpoint of improving the adhesiveness and corrosion resistance of the overcoat coating film in the coated metal sheet.

Additionally, that the coated metal sheet is a coated metal sheet for exterior is further effective from the viewpoint of reducing a load due to elution of chromium during actual use on the environment.

An exterior building material composed of the coated metal sheet is chromate-free as well as can exhibit excellent flat-portion corrosion resistance during actual use of 10 years or more.

The coated metal sheet is formed into an exterior building material by known processing such as bending, drawing, bulging, embossing, roll-forming or the like. In this manner, the exterior building material is composed of the coated metal sheet. The exterior building material may further include other structure in the range where the effects can be achieved. For example, the exterior building material may further have a structure to be subjected to appropriate installation during actual use of the exterior building material. Examples of such a structure include members to fix an exterior building material to a building, members to connect exterior building materials to one another, marks that show the direction of an exterior building material on mounting, foam sheets and foam layers to improve the thermal insulation properties and the like. These structures may be included in the coated metal sheet for exterior aforementioned.

Hereinafter, the present invention will be described in more detail with reference to Examples, but the present invention is not limited by these Examples.

EXAMPLES

[Production of Coated Base Sheets 1 to 3]

A hot-dip 55% Al—Zn alloy-plated steel sheet having an amount deposited on both the sides of 150 g/m$^2$ was alkali-degreased, and "SURFCOAT NRC300NS" manufactured by Nippon Paint Co., Ltd. ("SURFCOAT" is a registered trademark of the company), which is a chromate treatment solution, at 20° C. was applied to the surface of the plated layer of the plated steel sheet, as pre-coating treatment. The plated steel sheet was dried at 100° C. without washing with water to thereby obtain a chromate-treated steel sheet having an amount deposited of 20 mg/m$^2$ in terms of chromium. Additionally, the following chromate-free treatment solution, instead of the chromate treatment solution, was applied, and the plated steel sheet was dried at 100° C. without washing with water to thereby obtain a chromate-free chemical conversion steel sheet having an amount deposited of 10 mg/m$^2$ in terms of Ti.

(Chromate-Free Treatment Solution)

| | |
|---|---|
| Hexafluorotitanate | 55 g/L |
| Hexafluorozirconate | 10 g/L |
| Aminomethyl-substituted polyvinyl phenol | 72 g/L |
| Water | Balance |

To the surface of the chromate-free chemical conversion steel sheet, the following undercoat coating material 1 based on epoxy resin was applied. The chemical conversion steel sheet was heated such that the temperature of the plated steel sheet reached 200° C. to thereby obtain chromate-free coated base sheet 1 that had undercoat coating film 1 having a chromate-free dry film thickness of 5 μm. Additionally, chromate-free coated base sheet 2 that had a chromate-free undercoat coating film 2 having a dry film thickness of 5 μm was obtained in the same manner as coated base sheet 1 except that the following undercoat coating material 2 was used instead of undercoat coating material 1. Furthermore, chromium-containing coated base sheet 3 that had a chromium-containing undercoat coating film 3 having a dry film thickness of 5 μm was obtained in the same manner as coated base sheet 1 except that the chromate-treated steel sheet was used instead of the chromate-free chemical conversion steel sheet and that the following undercoat coating material 3 was used instead of undercoat coating material 1 was used.

(Undercoat Coating Material 1)

| | |
|---|---|
| Phosphate mixture | 15 vol % |
| Barium sulfate | 5 vol % |
| Silica | 1 vol % |
| Clear coating material | Balance |

(Undercoat Coating Material 2)

| | |
|---|---|
| Calcium vanadate | 15 vol % |
| Barium sulfate | 5 vol % |
| Silica | 1 vol % |
| Clear coating material | Balance |

(Undercoat Coating Material 3)

| | |
|---|---|
| Strontium chromate | 15 vol % |
| Barium sulfate | 5 vol % |
| Silica | 1 vol % |
| Clear coating material | Balance |

In the undercoat coating materials 1 to 3, the clear coating material is "NSC680" manufactured by Nippon Fine Coatings Co., Ltd. In the undercoat coating material 1, the phosphate mixture is a mixture of magnesium hydrogenphosphate, magnesium phosphate, zinc phosphate, and aluminum tripolyphosphate. Additionally, the vol % is a proportion based on the solid content in the undercoat coating material.

[Preparation of Overcoat Coating Material]

Overcoat coating materials 1 to 3 having the following composition were prepared. The clear coating material described below in overcoat coating material 1 is "CA clear coating material" manufactured by Nippon Fine Coatings Co., Ltd., the clear coating material described below in overcoat coating material 2 is "QK clear coating material" manufactured by the company, and the clear coating material described below in overcoat coating material 3 is "NSC3300 clear coating material" manufactured by the company. Carbon black is a coloring pigment. The vol % described below is a proportion based on the solid content in the overcoat coating material.

(Overcoat Coating Material)

| | |
|---|---|
| Carbon black | 7 vol % |
| Gloss adjusting agent | (the type and the amount blended are shown in Tables 1 to 5) |
| Clear coating material | Balance |

[Production of Coated Metal Sheets 1 to 10]

Overcoat coating material 1, prepared by blending 0.01 vol % of silica particles A (silica A) as the gloss adjusting agent, was applied to the surface of undercoat coating film 1 of coated base sheet 1. The coated base sheet 1 was heated such that the temperature of the plated steel sheet in coated base sheet 1 achieved 220° C. to thereby produce an overcoat coating film having a dry film thickness T of 11 μm. Coated metal sheet 1 was thus produced.

Silica particles A are powder prepared by cutting particles having a particle diameter of 0.4 T or more from "NIPGEL AZ-400" manufactured by Tosoh Silica Corporation ("NIPGEL" is a registered trademark of the company.) with a forced vortex-type centrifugal precision air classifier. "NIPGEL AZ-400", which has been produced by a wet gel method, corresponds to the aforementioned microporous particles. As determined with "Multisizer 4" manufactured by Beckman Coulter Inc. using an aperture tube having a diameter of 50 μm, the silica particles A for a film whose thickness T is 11 μm have an average particle diameter R of 2.5 μm, the standard deviation σ being 1.0 μm.

Coated metal sheets 2 to 4 were each produced in the same manner as coated metal sheet 1 except that the amount of silica particles A blended was changed as shown in Table 1. Additionally, coated metal sheets 5 to 7 were each produced in the same manner as coated metal sheet 2 except that the dry film thickness T was changed as shown in Table 1. The silica particles A for a film whose thickness T is 9 μm have an average particle diameter R of 2.0 μm, the standard deviation σ being 0.8 μm. The silica particles A for a film thickness T is 15 μm have an average particle diameter R of 2.8 μm, the standard deviation σ being 1.6 μm. The silica particles A for a film whose thickness T is 19 μm have an average particle diameter R of 3.0 μm, the standard deviation σ being 2.3 μm. Additionally, coated metal sheet 8 was produced in the same manner as coated metal sheet 2 except that the type of the coated base sheet was changed as shown in Table 1. Furthermore, coated metal sheets 9 and 10 were each produced in the same manner as coated metal sheet 2 except that the type of the overcoat coating material was changed as shown in Table 1.

Note that, coated metal sheet 2 was cut to allow its cross section to be exposed. The resultant was encapsulated inside a mass of epoxy resin, and its cross section was further ground and photographed with a scanning electron microscope. The resulting images of a plurality of spots were processed and analyzed to determine the particle size distribution of silica particles A. R and σ were confirmed to be substantially equivalent to the above-described numerical values.

[Production of Coated Metal Sheets 11 to 20]

Coated metal sheet 11 was produced in the same manner as coated metal sheet 1 except that overcoat coating material 1 to which 0.01 vol % of silica particles B (silica B) was blended as the gloss adjusting agent was used.

Silica particles B are powder prepared by cutting particles having a particle diameter of 0.3 T or more from "Sylysia 300P" manufactured by Fuji Silysia Chemical Ltd. with a forced vortex-type centrifugal precision air classifier. "Sylysia 300P", which has been produced by a wet gel method, corresponds to the aforementioned microporous particles. Silica particles B have an average particle diameter R of 2.0 μm, the standard deviation σ being 0.5 μm.

Coated metal sheets 12 to 14 were each produced in the same manner as coated metal sheet 11 except that the amount of silica particles B blended was changed as shown in Table 2. Additionally, coated metal sheets 15 to 17 were each produced in the same manner as coated metal sheet 12 except that the dry film thickness T was changed as shown in Table 2. The silica particles B for a film whose thickness T is 9 μm have an average particle diameter R of 2.0 μm, the standard deviation σ being 0.4 μm. The silica particles B for a film whose thickness T is 15 μm have an average particle diameter R of 2.2 μm, the standard deviation σ being 0.9 μm. The silica particles B for a film whose thickness T is 19 μm have an average particle diameter R of 2.2 μm, the standard deviation σ being 0.9 μm. Additionally, coated metal sheet 18 was produced in the same manner as coated metal sheet 12 except that the type of the coated base sheet was changed as shown in Table 2. Furthermore, coated metal sheets 19 and 20 were each produced in the same manner as coated metal sheet 12 except that the type of the overcoat coating material was changed as shown in Table 2.

[Production of Coated Metal Sheets 21 and 22]

Coated metal sheet 21 was produced in the same manner as coated metal sheet 12 except that coating material 1 to which 0.5 vol % of polyacrylonitrile (PAN) particles A (PAN-A) was blended in addition to 0.5 vol % of silica particles B as the gloss adjusting agents was used.

PAN particles A are powder prepared by cutting particles having a particle diameter of 0.55 T or more from "TAFTIC ASF-7" manufactured by Toyobo Co., Ltd. ("TAFTIC" is a registered trademark of the company.) with a forced vortex-type centrifugal precision air classifier. "TAFTIC ASF-7", which has been produced by pulverizing particles prepared by a spray dry method, corresponds to the aforementioned microporous particles. The PAN particles A for a film whose thickness T is 11 μm have an average particle diameter R of 5 μm, the standard deviation σ being 0.6 μm.

Additionally, coated metal sheet 22 was produced in the same manner as coated metal sheet 21 except that a calcium carbonate-calcium phosphate composite (CaCPC) was used instead of PAN particles A.

CaCPC particles are powder prepared by cutting particles having a particle diameter of 0.55 T or more from "Poronex" manufactured by MARUO CALCIUM CO., LTD. ("Poronex" is a registered trademark of the company.) with a forced vortex-type centrifugal precision air classifier. "Poronex", which has a petal-like porous structure, corresponds to the aforementioned microporous particles. The CaCPC particles for a film whose thickness T is 11 μm have an average particle diameter R of 5.0 μm, the standard deviation σ being 0.5 μm.

[Production of Coated Metal Sheets 23 to 31]

Coated metal sheet 23 was produced in the same manner as coated metal sheet 1 except that overcoat coating material 1 to which 0.01 vol % of PAN particles A was blended as the gloss adjusting agent was used.

Coated metal sheets 24 to 26 were each produced in the same manner as coated metal sheet 23 except that the amount of PAN particles A blended was changed as shown in Table 3. Additionally, coated metal sheets 27 and 28 were each produced in the same manner as coated metal sheet 24 except that the dry film thickness T was changed as shown in Table 3. The PAN particles A for a film whose thickness T is 15 μm have an average particle diameter R of 6.2 μm, the standard deviation σ being 1.0 μm. The PAN particles A for a film whose thickness T is 19 μm have an average particle diameter R of 6.7 μm, the standard deviation σ being 1.9 μm. Additionally, coated metal sheet 29 was produced in the same manner as coated metal sheet 24 except that the type of the coated base sheet was changed as shown in Table 3. Moreover, coated metal sheets 30 and 31 were each produced in the same manner as coated metal sheet 24 except that the type of the overcoat coating material was changed as shown in Table 3.

[Production of Coated Metal Sheets 32 to 40]

Coated metal sheet 32 was produced in the same manner as coated metal sheet 1 except that overcoat coating material 1 to which 0.01 vol % of CaCPC particles was blended as the gloss adjusting agent was used.

Coated metal sheets 33 to 35 were each produced in the same manner as coated metal sheet 32 except that the amount of CaCPC particles blended was changed as shown in Table 3. Additionally, coated metal sheets 36 and 37 were each produced in the same manner as coated metal sheet 33 except that the dry film thickness T was changed as shown in Table 3. The CaCPC particles for a film whose thickness T is 15 μm have an average particle diameter R of 5.4 μm, the standard deviation σ being 1.4 μm. The CaCPC particles for a film whose thickness T is 19 μm have an average particle diameter R of 5.5 μm, the standard deviation σ being 1.5 μm. Additionally, coated metal sheet 38 was produced in the same manner as coated metal sheet 33 except that the type of the coated base sheet was changed as shown in Table 3. Moreover, coated metal sheets 39 and 40 were each produced in the same manner as coated metal sheet 33 except that the type of the overcoat coating material was changed as shown in Table 3.

[Production of Coated Metal Sheets 41 to 57]

Coated metal sheet 41 was produced in the same manner as coated metal sheet 2 except that overcoat coating material 1 to which no gloss adjusting agent was blended was used.

Coated metal sheet 42 was produced in the same manner as coated metal sheet 41 except that overcoat coating material 1 to which 1 vol % of silica particles C (silica C) was blended as the gloss adjusting agent was used.

Silica particles C, which are "Light Star LA-OS26BK" manufactured by Nissan Chemical Industries, Ltd., correspond to the aforementioned microporous particles. The silica particles H for a film whose thickness T is 11 μm have an average particle diameter R of 0.7 μm, the standard deviation σ being 0.2 μm.

Coated metal sheet 43 was produced in the same manner as coated metal sheet 42 except that silica particles D (silica D) were used instead of silica particles C.

Silica particles D, which are "NIPGEL AZ-410" manufactured by Tosoh Silica Corporation, correspond to the aforementioned microporous particles. "NIPGEL AZ-410" has been produced by a wet gel method. When the film thickness T is 11 μm, silica particles D have an average particle diameter R of 4.2 μm, the standard deviation σ being 3.8 μm.

Coated metal sheets 44 to 46 were each produced in the same manner as coated metal sheet 42 except that the amount of silica particles D blended was changed as shown in Table 4. Additionally, coated metal sheets 47 and 48 were each produced in the same manner as coated metal sheet 43 except that the dry film thickness T was changed as shown in Table 4. The silica particles D for films whose thicknesses T are 7 μm and 25 μm have an average particle diameter R of 4.2 μm, the standard deviation σ being 3.8 μm, for both film thicknesses, in both cases. Furthermore, coated metal sheets 49 and 50 were each produced in the same manner as coated metal sheet 43 except that the type of the coated base sheet was changed as shown in Table 4. Moreover, coated metal sheets 51 and 52 were each produced in the same manner as coated metal sheet 43 except that the type of the overcoat coating material was changed as shown in Table 4.

[Production of Coated Metal Sheets 53 to 57]

Coated metal sheet 53 was produced in the same manner as coated metal sheet 43 except that silica particles E (silica E) were used instead of silica particles D.

Silica particles E, which are "NIPGEL BY-001" manufactured by Tosoh Silica Corporation, correspond to the aforementioned microporous particles. "NIPGEL BY-001" has been produced by a wet gel method.

The silica particles E for a film whose thickness T is 11 μm have an average particle diameter R of 13.0 μm, the standard deviation σ being 10.7 μm.

Coated metal sheet 54 was produced in the same manner as coated metal sheet 53 except that silica particles F (silica F) were used instead of silica particles E.

Silica particles F, which are "NIPGEL AZ-460" manufactured by Tosoh Silica Corporation, produced by a wet gel method followed by treatment with organic material, correspond to the aforementioned microporous particles. The silica particles F for a film whose thickness T is 11 μm have an average particle diameter R of 4.4 μm, the standard deviation σ being 3.7 μm.

Coated metal sheet 55 was produced in the same manner as coated metal sheet 54 except that silica particles G (silica G) were used instead of silica particles F.

Silica particles G, which are "ACEMAT TTS100" manufactured by NIPPON AEROSIL CO., LTD., produced by a dry combustion method, correspond to the aforementioned microporous particles. The silica particles G for a film whose thickness T is 11 μm have an average particle diameter R of 9.5 μm, the standard deviation σ being 1.8 μm.

Additionally, coated metal sheet 56 was produced in the same manner as coated metal sheet 55 except that silica particles H (silica H) were used instead of silica particles G.

Silica particles H, which are "ACEMAT TT3300" manufactured by NIPPON AEROSIL CO., LTD., produced by a dry combustion method followed by treatment with organic material, correspond to the aforementioned microporous particles. The silica particles H for a film whose thickness T is 11 μm have an average particle diameter R of 9.5 μm, the standard deviation σ being 2.7 μm.

Additionally, coated metal sheet 57 was produced in the same manner as coated metal sheet 12 except that overcoat coating material 1 to which 1 vol % of silica particles B was blended as the gloss adjusting agent and that the dry film thickness T was changed as shown in Table 4. The silica particles B for a film whose thickness T is 5 μm have an average particle diameter R of 1.3 μm, the standard deviation σ being 0.2 μm.

[Production of Coated Metal Sheets 58 to 65]

Coated metal sheet 58 was produced in the same manner as coated metal sheet 24 except that overcoat coating material 1 to which 1.0 vol % of polyacrylonitrile (PAN) particles B (PAN-B) was blended as the gloss adjusting agent was used.

PAN particles B, which are "TAFTIC ASF-7" manufactured by Toyobo Co., Ltd., correspond to the aforementioned microporous particles. The PAN particles B for a film whose thickness T is 11 μm have an average particle diameter R of 7.0 μm, the standard deviation σ being 2.4 μm.

Coated metal sheets 59 to 61 were each produced in the same manner as coated metal sheet 58 except that the amount of PAN particles B blended was changed as shown in Table 5. Furthermore, coated metal sheets 62 and 63 were each produced in the same manner as coated metal sheet 58 except that the type of the coated base sheet was changed as shown in Table 5. Moreover, coated metal sheets 64 and 65 were each produced in the same manner as coated metal sheet 58 except that the type of the overcoat coating material was changed as shown in Table 5.

[Production of Coated Metal Sheet 66]

Coated metal sheet 66 was produced in the same manner as coated metal sheet 24 except that overcoat coating material 1 to which 1.0 vol % of polyacrylonitrile (PAN) particles C (PAN-C) was blended as the gloss adjusting agent was used.

PAN particles C are "TAFTIC A-10" manufactured by Toyobo Co., Ltd. "TAFTIC A-10", which are approximate disk-shape particles having a recess in the center on both sides or a through-hole, corresponds to the aforementioned microporous particles. The PAN particles C for a film whose thickness T is 11 µm have an average particle diameter R of 10.0 µm, the standard deviation σ being 7.0 µm.

[Production of Coated Metal Sheets 67 to 70]

Silica I was prepared. First, into a reaction vessel equipped with a stirrer, 100 g of commercially available No. 3 sodium silicate ($SiO_2$: 21.9 mass %, $Na_2O$: 7.1 mass %, $SiO_2/Na_2O$=3.19) (7 mass % as the $SiO_2$ concentration in the total amount of the solution) was weighed. After addition of 100 g of water, to the solution adjusted to 50° C., 65 g of an acrylamide polymer aqueous solution (10 mass % aqueous solution, weight average molecular weight: 500,000) was added under slow stirring and sufficiently dispersed. The amount of the aqueous solution added is an amount such that polyacrylamide anhydride reaches 30 mass % relative to $SiO_2$.

Subsequently, to the above-described mixed solution, 5 mass % sulfuric acid adjusted to 50° C. in advance was added, and the pH of the mixed solution was adjusted to 10. Then, stirring was stopped, and the mixed solution was left to stand as it was for 100 hours. Thereafter, the solution was stirred and dispersed, and the precipitate was filtered from the mother liquid. The resulting cake was redispersed in water. After sufficient dispersion, 5 mass % sulfuric acid was added to the solution until the pH reached 2.0. When the pH of the dispersion solution was substantially stabilized at 2.0, stirring was continued for 24 hours. The dispersion solution was filtered and washed with water, and furthermore, the cake was repulped to be a 15 mass % spherical silica-particle slurry.

Subsequently, the slurry was filtered, and the resulting cake was dried in a constant-temperature dryer at 110° C. overnight. Thereafter, the cake was pulverized with a sample mill to thereby obtain silica particles I (silica I). Silica particles I correspond to the aforementioned microporous particles. The particle size distribution of silica particles I was determined with "Multisizer 4" manufactured by Beckman Coulter Inc. using an aperture tube having a diameter of 50 µm. The silica particles I for a film whose thickness T is 11 µm have an average particle diameter R of 2.7 µm, the standard deviation σ being 1.2 µm. The maximum value in the number particle size distribution of silica particles I (the intersection of the particle size distribution curved and the baseline) was 5.7 µm, which was thus less than 11 µm (0.5 T).

Coated metal sheet 67 was produced in the same manner as coated metal sheet 1 except that overcoat coating material 1 to which 0.01 vol % of silica particles I was blended as the gloss adjusting agent was used. Additionally, coated metal sheets 68 to 70 were each produced in the same manner as coated metal sheet 67 except that the amount of silica particles I blended was changed as shown in Table 6.

[Production of Coated Metal Sheets 71 to 74]

Coated metal sheet 71 was produced in the same manner as coated metal sheet 1 except that overcoat coating material 1 to which 0.01 vol % of silica particles J (silica J) was blended as the gloss adjusting agent was used.

Silica particles J are powder prepared by cutting particles having a particle diameter of 0.7 T or more from "NIPGEL BY-601" manufactured by Tosoh Silica Corporation ("NIPGEL" is a registered trademark of the company.) with a forced vortex-type centrifugal precision air classifier. "NIPGEL BY-601", which has been produced by a wet gel method, corresponds to the aforementioned microporous particles. As determined with "Multisizer 4" manufactured by Beckman Coulter Inc. using an aperture tube having a diameter of 50 µm, the silica particles J for a film whose thickness T is 11 µm have an average particle diameter R of 4.3 µm, the standard deviation σ being 1.7 µm.

Coated metal sheets 72 to 74 were each produced in the same manner as coated metal sheet 71 except that the amount of silica particles J blended was changed as shown in Table 6.

[Evaluation]

Coated metal sheets 1 to 74 were each subjected to the measurement and test described below.

(1) Glossiness at 60 Degrees

Specular glossiness at 60° (G60), specified by JIS K5600-4-7 (ISO2813: 1994), of each of coated metal sheets 1 to 74 was measured with Gloss meter VG-2000 manufactured by NIPPON DENSHOKU INDUSTRIES CO., LTD.

(2) Coating Appearance

The appearance of the coating film of each of coated metal sheets 1 to 74 after drying was evaluated in accordance with the following criteria.

(Evaluation Criteria)

Y1: No abnormal glossiness and coating film defects are observed, and a flat enamel appearance is observed Y2: Any of abnormalities D1 to D5 shown below is observed D1: Gloss cannot be controlled D2: Gloss is extremely high D3: Gloss is extremely low D4: Unevenness of the coating film is large, and a flat enamel appearance cannot be obtained D5: Coating film blistering caused by volatile components on baking the coating film is observed (occurs in the case of thick film)

(3) Processed-Part Adhesiveness

Coated metal sheets 1 to 74 were each subjected to 0 T bending (adhesion bending), and the 0 T bended portion was subjected to cellophane tape-peeling test and evaluated in accordance with the following criteria.

(Evaluation Criteria)

N: Peeling of the coating film is not observed

Y: Peeling of the coating film is observed (4) Flat-Portion Corrosion Resistance First, coated metal sheets 1 to 74 were each subjected to the xenon lamp method-accelerated weathering test specified by JIS K5600-7-7 (ISO11341: 2004) for 1,000 hours. Then, each sheet was subjected to the "neutral salt water spray cycle test" specified by JIS H8502 (so-called JASO method) for 720 hours. The two tests were conducted as one cycle. Test products subjected to one cycle (corresponding to about five-year service life in actual use) and test products subjected to two cycles (corresponding to about 10-year service life) each for coated metal sheets 1 to 74 were washed with water. After observed for the presence or absence of coating film blistering at the flat portion of the coated metal sheet by visual observation and magnified observation with a loupe having a magnification of 10, the sheets were evaluated in accordance with the following criteria.

(Evaluation Criteria)
N: No blistering is observed
Y1: Slightly subtle blistering is observed by magnified observation, but no blistering is visually observed
Y2: Blistering is visually observed The materials, physical property values, and evaluation results of coated metal sheets 1 to 74 are shown in Tables 1 to 6.

TABLE 1

| Coated metal sheet No. | Gloss adjusting agent | | Coated base sheet | Overcoat coating film | | | | G60 (—) | Coating appearance | Processed-part adhesiveness | Flat-portion | | Remark |
|---|---|---|---|---|---|---|---|---|---|---|---|---|---|
| | Type | R (μm) | σ (μm) | | Type of coating material | T (μm) | Amount blended (vol %) | $(R + 2\sigma)/T$ (—) | | | | 1 cycle | 2 cycles | |
| 1 | Silica A | 2.5 | 1.0 | 1 | 1 | 11 | 0.01 | 0.4 | 85 | Y1 | N | N | N | Example |
| 2 | Silica A | 2.5 | 1.0 | 1 | 1 | 11 | 1 | 0.4 | 84 | Y1 | N | N | N | Example |
| 3 | Silica A | 2.5 | 1.0 | 1 | 1 | 11 | 5 | 0.4 | 61 | Y1 | N | N | N | Example |
| 4 | Silica A | 2.5 | 1.0 | 1 | 1 | 11 | 15 | 0.4 | 25 | Y1 | N | N | N | Example |
| 5 | Silica A | 2.0 | 0.8 | 1 | 1 | 9 | 1 | 0.4 | 77 | Y1 | N | N | N | Example |
| 6 | Silica A | 2.8 | 1.6 | 1 | 1 | 15 | 1 | 0.4 | 82 | Y1 | N | N | N | Example |
| 7 | Silica A | 3.0 | 2.3 | 1 | 1 | 19 | 1 | 0.4 | 83 | Y1 | N | N | N | Example |
| 8 | Silica A | 2.5 | 1.0 | 2 | 1 | 11 | 1 | 0.4 | 79 | Y1 | N | N | N | Example |
| 9 | Silica A | 2.5 | 1.0 | 1 | 2 | 11 | 1 | 0.4 | 80 | Y1 | N | N | N | Example |
| 10 | Silica A | 2.5 | 1.0 | 1 | 3 | 11 | 1 | 0.4 | 79 | Y1 | N | N | N | Example |

TABLE 2

| Coated metal sheet No. | Gloss adjusting agent | | | Coated base sheet | Overcoat coating | | | | G60 (—) | Coating appearance | Processed-part adhesiveness | Flat-portion | | Remark |
|---|---|---|---|---|---|---|---|---|---|---|---|---|---|---|
| | Type | R (μm) | σ (μm) | | Type of coating material | T (μm) | Amount blended (vol %) | $(R + 2\sigma)/T$ (—) | | | | 1 cycle | 2 cycles | |
| 11 | Silica B | 2.0 | 0.5 | 1 | 1 | 11 | 0.01 | 0.3 | 85 | Y1 | N | N | N | Example |
| 12 | Silica B | 2.0 | 0.5 | 1 | 1 | 11 | 1 | 0.3 | 84 | Y1 | N | N | N | Example |
| 13 | Silica B | 2.0 | 0.5 | 1 | 1 | 11 | 5 | 0.3 | 63 | Y1 | N | N | N | Example |
| 14 | Silica B | 2.0 | 0.5 | 1 | 1 | 11 | 15 | 0.3 | 28 | Y1 | N | N | N | Example |
| 15 | Silica B | 2.0 | 0.4 | 1 | 1 | 9 | 1 | 0.3 | 81 | Y1 | N | N | N | Example |
| 16 | Silica B | 2.2 | 0.9 | 1 | 1 | 15 | 1 | 0.3 | 84 | Y1 | N | N | N | Example |
| 17 | Silica B | 2.2 | 0.9 | 1 | 1 | 19 | 1 | 0.2 | 85 | Y1 | N | N | N | Example |
| 18 | Silica B | 2.0 | 0.5 | 2 | 1 | 11 | 1 | 0.3 | 83 | Y1 | N | N | N | Example |
| 19 | Silica B | 2.0 | 0.5 | 1 | 2 | 11 | 1 | 0.3 | 84 | Y1 | N | N | N | Example |
| 20 | Silica B | 2.0 | 0.5 | 1 | 3 | 11 | 1 | 0.3 | 84 | Y1 | N | N | N | Example |
| 21 | Silica B | 2.0 | 0.5 | 1 | 1 | 11 | 0.5 | 0.3 | 81 | Y1 | N | N | N | Example |
| | PAN-A | 5.0 | 0.6 | | | | 0.5 | 0.6 | | | | | | Example |
| 22 | Silica B | 2.0 | 0.5 | 1 | 1 | 11 | 0.5 | 0.3 | 81 | Y1 | N | N | N | Example |
| | CaCPC | 5.0 | 0.5 | | | | 0.5 | 0.5 | | | | | | Example |

TABLE 3

| Coated metal sheet No. | Gloss adjusting agent | | | Coated base sheet | Overcoat coating | | | | G60 (—) | Coating appearance | Processed-part adhesiveness | Flat-portion | | Remark |
|---|---|---|---|---|---|---|---|---|---|---|---|---|---|---|
| | Type | R (μm) | σ (μm) | | Type of coating material | T (μm) | Amount blended (vol %) | $(R + 2\sigma)/T$ (—) | | | | 1 cycle | 2 cycles | |
| 23 | PAN-A | 5.0 | 0.6 | 1 | 1 | 11 | 0.01 | 0.6 | 85 | Y1 | N | N | Y1 | Example |
| 24 | PAN-A | 5.0 | 0.6 | 1 | 1 | 11 | 1 | 0.6 | 80 | Y1 | N | N | Y1 | Example |
| 25 | PAN-A | 5.0 | 0.6 | 1 | 1 | 11 | 5 | 0.6 | 58 | Y1 | N | N | Y1 | Example |
| 26 | PAN-A | 5.0 | 0.6 | 1 | 1 | 11 | 15 | 0.6 | 20 | Y1 | N | N | Y1 | Example |
| 27 | PAN-A | 6.2 | 1.0 | 1 | 1 | 15 | 1 | 0.5 | 82 | Y1 | N | N | N | Example |

TABLE 3-continued

| Coated metal sheet No. | Gloss adjusting agent Type | R (μm) | σ (μm) | Coated base sheet | Overcoat coating Type of coating material | T (μm) | Amount blended (vol %) | (R + 2σ)/T (—) | G60 (—) | Coating appearance | Processed-part adhesiveness | Flat-portion 1 cycle | Flat-portion 2 cycles | Remark |
|---|---|---|---|---|---|---|---|---|---|---|---|---|---|---|
| 28 | PAN-A | 6.7 | 1.9 | 1 | 1 | 19 | 1 | 0.6 | 83 | Y1 | N | N | N | Example |
| 29 | PAN-A | 5.0 | 0.6 | 2 | 1 | 11 | 1 | 0.6 | 80 | Y1 | N | N | Y1 | Example |
| 30 | PAN-A | 5.0 | 0.6 | 1 | 2 | 11 | 1 | 0.6 | 80 | Y1 | N | N | Y1 | Example |
| 31 | PAN-A | 5.0 | 0.6 | 1 | 3 | 11 | 1 | 0.6 | 80 | Y1 | N | N | Y1 | Example |
| 32 | CaCPC | 5.0 | 0.5 | 1 | 1 | 11 | 0.01 | 0.5 | 85 | Y1 | N | N | N | Example |
| 33 | CaCPC | 5.0 | 0.5 | 1 | 1 | 11 | 1 | 0.5 | 80 | Y1 | N | N | N | Example |
| 34 | CaCPC | 5.0 | 0.5 | 1 | 1 | 11 | 5 | 0.5 | 59 | Y1 | N | N | N | Example |
| 35 | CaCPC | 5.0 | 0.5 | 1 | 1 | 11 | 15 | 0.5 | 21 | Y1 | N | N | N | Example |
| 36 | CaCPC | 5.4 | 1.4 | 1 | 1 | 15 | 1 | 0.5 | 83 | Y1 | N | N | N | Example |
| 37 | CaCPC | 5.5 | 1.5 | 1 | 1 | 19 | 1 | 0.4 | 84 | Y1 | N | N | N | Example |
| 38 | CaCPC | 5.0 | 0.5 | 2 | 1 | 11 | 1 | 0.5 | 80 | Y1 | N | N | N | Example |
| 39 | CaCPC | 5.0 | 0.5 | 1 | 2 | 11 | 1 | 0.5 | 81 | Y1 | N | N | N | Example |
| 40 | CaCPC | 5.0 | 0.5 | 1 | 3 | 11 | 1 | 0.5 | 80 | Y1 | N | N | N | Example |

TABLE 4

| Coated metal sheet No. | Gloss adjusting agent Type | R (μm) | σ (μm) | Coated base sheet | Overcoat coating film Type of coating material | T (μm) | Amount blended (vol %) | (R + 2σ)/T (—) | G60 (—) | Coating appearance | Processed-part adhesiveness | Flat-portion 1 cycle | Flat-portion 2 cycles | Remark |
|---|---|---|---|---|---|---|---|---|---|---|---|---|---|---|
| 41 | — | — | — | 1 | 1 | 11 | — | | 87 | Y2 D1 | N | — | — | Comparative Example |
| 42 | Silica C | 0.7 | 0.2 | 1 | 1 | 11 | 1 | 0.1 | 87 | Y2 D2 | N | — | — | Comparative Example |
| 43 | Silica D | 4.2 | 3.8 | 1 | 1 | 11 | 1 | 1.1 | 80 | Y1 | N | Y1 | Y2 | Comparative Example |
| 44 | Silica D | 4.2 | 3.8 | 1 | 1 | 11 | 5 | 1.1 | 46 | Y1 | N | Y1 | Y2 | Comparative Example |
| 45 | Silica D | 4.2 | 3.8 | 1 | 1 | 11 | 13 | 1.1 | 20 | Y1 | N | Y1 | Y2 | Comparative Example |
| 46 | Silica D | 4.2 | 3.8 | 1 | 1 | 11 | 20 | 1.1 | 7 | Y2 D3 | Y | — | — | Comparative Example |
| 47 | Silica D | 4.2 | 3.8 | 1 | 1 | 7 | 1 | 1.7 | 75 | Y2 D4 | N | — | — | Comparative Example |
| 48 | Silica D | 4.2 | 3.8 | 1 | 1 | 25 | 1 | 0.8 | 84 | Y2 D5 | — | — | — | Comparative Example |
| 49 | Silica D | 4.2 | 3.8 | 3 | 1 | 11 | 1 | 1.1 | 79 | Y1 | N | N | Y1 | Reference Example |
| 50 | Silica D | 4.2 | 3.8 | 2 | 1 | 11 | 1 | 1.1 | 80 | Y1 | N | Y1 | Y2 | Comparative Example |
| 51 | Silica D | 4.2 | 3.8 | 1 | 2 | 11 | 1 | 1.1 | 78 | Y1 | N | Y1 | Y2 | Comparative Example |
| 52 | Silica D | 4.2 | 3.8 | 1 | 3 | 11 | 1 | 1.1 | 79 | Y1 | N | Y1 | Y2 | Comparative Example |
| 53 | Silica E | 13 | 10.7 | 1 | 1 | 11 | 1 | 3.1 | 73 | Y2 D4 | N | — | — | Comparative Example |
| 54 | Silica F | 4.4 | 3.7 | 1 | 1 | 11 | 1 | 1.1 | 79 | Y1 | N | Y1 | Y2 | Comparative Example |
| 55 | Silica G | 9.5 | 1.8 | 1 | 1 | 11 | 1 | 1.2 | 75 | Y1 | N | Y2 | Y2 | Comparative Example |
| 56 | Silica H | 9.5 | 2.7 | 1 | 1 | 11 | 3 | 1.4 | 58 | Y2 D4 | N | — | — | Comparative Example |
| 57 | Silica B | 1.3 | 0.2 | 1 | 1 | 5 | 1 | 0.3 | 87 | Y2 D2 | N | — | — | Comparative Example |

TABLE 5

| Coated metal sheet No. | Gloss adjusting agent Type | R (μm) | σ (μm) | Coated base sheet | Overcoat coating Type of coating material | T (μm) | Amount blended (vol %) | (R + 2σ)/T (—) | G60 (—) | Coating appearance | Processed-part adhesiveness | Flat-portion 1 cycle | 2 cycles | Remark |
|---|---|---|---|---|---|---|---|---|---|---|---|---|---|---|
| 58 | PAN-B | 7.0 | 2.4 | 1 | 1 | 11 | 1 | 1.1 | 77 | Y1 | N | Y1 | Y2 | Comparative Example |
| 59 | PAN-B | 7.0 | 2.4 | 1 | 1 | 11 | 5 | 1.1 | 48 | Y1 | N | Y1 | Y2 | Comparative Example |
| 60 | PAN-B | 7.0 | 2.4 | 1 | 1 | 11 | 13 | 1.1 | 23 | Y1 | N | Y1 | Y2 | Comparative Example |
| 61 | PAN-B | 7.0 | 2.4 | 1 | 1 | 11 | 20 | 1.1 | 5 | Y2 D3 | Y | — | — | Comparative Example |
| 62 | PAN-B | 7.0 | 2.4 | 3 | 1 | 11 | 1 | 1.1 | 77 | Y1 | N | N | Y1 | Reference Example |
| 63 | PAN-B | 7.0 | 2.4 | 2 | 1 | 11 | 1 | 1.1 | 76 | Y1 | N | Y1 | Y2 | Comparative Example |
| 64 | PAN-B | 7.0 | 2.4 | 1 | 2 | 11 | 1 | 1.1 | 77 | Y1 | N | Y1 | Y2 | Comparative Example |
| 65 | PAN-B | 7.0 | 2.4 | 1 | 3 | 11 | 1 | 1.1 | 78 | Y1 | N | Y1 | Y2 | Comparative Example |
| 66 | PAN-C | 10.0 | 7.0 | 1 | 1 | 11 | 1 | 2.2 | 70 | Y2 D4 | N | — | — | Comparative Example |

TABLE 6

| Coated metal sheet No. | Gloss adjusting agent Type | R (μm) | σ (μm) | Coated base sheet | Overcoat coating film Type of coating material | T (μm) | Amount blended (vol %) | (R + 2σ)/T (—) | G60 (—) | Coating appearance | Processed-part adhesiveness | Flat-portion 1 cycle | 2 cycles | Remark |
|---|---|---|---|---|---|---|---|---|---|---|---|---|---|---|
| 67 | Silica I | 2.7 | 1.2 | 1 | 1 | 11 | 0.01 | 0.5 | 85 | Y1 | N | N | N | Example |
| 68 | Silica I | 2.7 | 1.2 | 1 | 1 | 11 | 1 | 0.5 | 83 | Y1 | N | N | N | Example |
| 69 | Silica I | 2.7 | 1.2 | 1 | 1 | 11 | 5 | 0.5 | 59 | Y1 | N | N | N | Example |
| 70 | Silica I | 2.7 | 1.2 | 1 | 1 | 11 | 15 | 0.5 | 24 | Y1 | N | N | N | Example |
| 71 | Silica J | 4.3 | 1.7 | 1 | 1 | 11 | 0.01 | 0.7 | 83 | Y1 | N | N | N | Example |
| 72 | Silica J | 4.3 | 1.7 | 1 | 1 | 11 | 1 | 0.7 | 80 | Y1 | N | N | N | Example |
| 73 | Silica J | 4.3 | 1.7 | 1 | 1 | 11 | 5 | 0.7 | 59 | Y1 | N | N | N | Example |
| 74 | Silica J | 4.3 | 1.7 | 1 | 1 | 11 | 15 | 0.7 | 22 | Y1 | N | N | N | Example |

As clear from Tables 1 to 6, having (R+2σ)/T of 0.7 or less, coated metal sheets 1 to 40 and 67 to 74 have designability of enamel-like gloss, have sufficient processed-part adhesiveness, and have flat-portion corrosion resistance corresponding to 10 years of actual use even though the sheets are chromate-free. Particularly, the flat-portion corrosion resistance in the above-described coated metal sheets is, apparent from the comparison with coated metal sheets 49 and 62, equivalent to or greater than the flat-portion corrosion resistance of a coated metal sheet subjected to chromate-containing chemical conversion to the metal sheet and containing chromium as the anti-rust pigment.

Also, as clear from Tables 1 to 3, it is obvious that at least 2 μm or more of the number average particle diameter R of the gloss adjusting agent (microporous particles) is effective for adjusting gloss in the range where the expressions are satisfied.

Additionally, as clear from coated metal sheets 2 and 5 to 7, and 12 and 15 to 17, it can be seen that the intended glossiness can be obtained and both the processed-part adhesiveness and flat-portion corrosion resistance are sufficient when the film thickness T of the overcoat coating film is in the range of 9 to 19 μm.

Furthermore, as clear from coated metal sheets 1 to 4, 11 to 14, 23 to 26, and 32 to 35, it is possible to adjust the specular glossiness at 60°, specified by JIS K5600, of the coated metal sheet to approximately 20 to 85 if the amount of the gloss adjusting agent blended in the overcoat coating film is 0.01 to 15 vol %.

Moreover, as clear from coated metal sheets 71 to 74, it can be seen that the processed-part adhesiveness, flat-portion corrosion resistance, and designability are all sufficiently exhibited if (R+2σ)/T of the gloss adjusting agent (silica particles J) is 0.7 or less. As clear from coated metal sheets 67 to 70, it can be seen that the processed-part adhesiveness, flat-portion corrosion resistance, and designability are all sufficiently exhibited if the gloss adjusting agent (silica particles I) satisfies the condition of "(R+2σ)/T is 0.7 or less", even without particle size adjustment such as classification, cutting of coarse particles and the like.

Meanwhile, as shown in Tables 4 and 5, all the coated metal sheets having (R+2σ)/T more than 0.7 were not able to achieve flat-portion corrosion resistance corresponding to 10 years of actual use. In particular, as clear from coated metal sheets 46 and 61, when the amount of the gloss adjusting agent blended in the overcoat coating film is extremely large, the processed-part adhesiveness became insufficient, enamel-like gloss was not obtained, and the designability was also insufficient. As clear from coated metal sheets 47, 48, 53, 55, 56, and 66, when $(R+2\sigma)/T$ increases, or as clear from coated metal sheet 57, when the film thickness T of the overcoat coating film becomes smaller (less than 9 μm), it can be seen that the unevenness of the coating film becomes large and an enamel-like appearance cannot be obtained, or even flat-portion corrosion resistance corresponding to five years of actual use cannot be obtained.

This application claims the priority of Japanese Patent Application No. 2014-59948 filed on Mar. 24, 2014, the entire contents of which including the specification and drawings are incorporated herein by reference.

INDUSTRIAL APPLICABILITY

In the coated metal sheet according to the present invention, reduction in the corrosion resistance in the flat portion, attributable to exposure, collapse, and fall-off of the gloss adjusting agent from the overcoat coating film, is prevented. Thus, a coated metal sheet that exhibits the intended appearance and corrosion resistance for a long period can be obtained, even if used in an exterior application for a long period. Accordingly, the present invention is expected to further prolong the life of coated metal sheets for exterior and to further enhance their usage.

REFERENCE SIGNS LIST

11 Base steel sheet
12 Coating film
15 Gloss adjusting agent
22 Overcoat coating film

The invention claimed is:

1. A chromate-free coated metal sheet, comprising:
a metal sheet and an overcoat coating film disposed on the metal sheet,
wherein the metal sheet includes any one selected from the group consisting of a cold-rolled steel sheet, a galvanized steel sheet, a Zn—Al alloy-plated steel sheet, a Zn—Al—Mg alloy-plated steel sheet, an aluminum-plated steel sheet, a stainless steel sheet, and a copper sheet,
wherein the overcoat coating film comprises particles, as a gloss adjusting agent, having micropores,
wherein the content of the gloss adjusting agent in the overcoat coating film is 0.01 to 15 vol %, and
wherein the coated metal sheet satisfies the following expressions:

$(R+2\sigma)/T \leq 0.7$, $R \geq 2.0$, $9 \leq T \leq 19$, and $\sigma < 0.3T$, wherein R (μm) is an average particle diameter of the gloss adjusting agent, T (μm) is a film thickness of the overcoat coating film, and σ is a standard deviation of a particle size distribution of the gloss adjusting agent.

2. The coated metal sheet according to claim 1, further comprising an undercoat coating film between the metal sheet and the overcoat coating film.

3. The coated metal sheet according to claim 1, wherein the gloss adjusting agent is silica.

4. The coated metal sheet according to claim 1, wherein the value L of the overcoat coating film is 70 or less, and the film thickness T of the overcoat coating film is 13 μm or less.

5. The coated metal sheet according to claim 1, wherein the value L of the overcoat coating film is more than 80, and the film thickness T of the overcoat coating film is 15 μm or more.

6. The coated metal sheet according to claim 1, wherein the absolute value ΔL of the difference between the value L of the overcoat coating film and the value L of the color of the surface of the metal sheet before the overcoat coating film is formed is 10 or less, and the film thickness T of the overcoat coating film is 11 μm or less.

7. The coated metal sheet according to claim 1, wherein the absolute value ΔL of the difference between the value L of the overcoat coating film and the value L of the color of the surface of the metal sheet before the overcoat coating film is formed is 20 or less, and the film thickness T of the overcoat coating film is 13 μm or less.

8. The coated metal sheet according to claim 1, wherein the absolute value ΔL of the difference between the value L of the overcoat coating film and the value L of the color of the surface of the metal sheet before the overcoat coating film is formed is 50 or less, and the film thickness T of the overcoat coating film is 15 μm or less.

9. The coated metal sheet according to claim 1, having a glossiness at 60° of 20 to 85.

10. The coated metal sheet according to claim 1, wherein the coated metal sheet is a coated metal sheet for exterior.

11. An exterior building material composed of the coated metal sheet according to claim 1.

12. The exterior building material according to claim 11, further comprising one or more selected from the group consisting of members to fix the exterior building material to a building, members to connect the exterior building material(s) to one another, marks that show the direction of the exterior building material on mounting, and foam sheets or foam layers to improve thermal insulation properties.

13. A chromate-free coated metal sheet, comprising:
a metal sheet and an overcoat coating film disposed on the metal sheet,
wherein the metal sheet includes any one selected from the group consisting of a cold-rolled steel sheet, a galvanized steel sheet, a Zn—Al alloy-plated steel sheet, a Zn—Al—Mg alloy-plated steel sheet, an aluminum-plated steel sheet, a stainless steel sheet, and a copper sheet,
wherein the overcoat coating film comprises particles, as a gloss adjusting agent, having micropores,
wherein the content of the gloss adjusting agent in the overcoat coating film is 0.01 to 15 vol %, and
wherein the coated metal sheet satisfies the following expressions:

$R \geq 2.0$, and $9 \leq T \leq 19$, wherein R (μm) is an average particle diameter of the gloss adjusting agent and T (μm) is a film thickness of the overcoat coating film, and a maximum value of a particle diameter in a particle size distribution of the gloss adjusting agent is 0.7T or less.

14. The coated metal sheet according to claim 13, wherein the maximum value of the particle diameter in the particle size distribution of the gloss adjusting agent is 0.6T or less.

15. The coated metal sheet according to claim 13, further comprising an undercoat coating film between the metal sheet and the overcoat coating film.

16. The coated metal sheet according to claim 13, wherein the gloss adjusting agent is silica.

17. The coated metal sheet according to claim 13, wherein the value L of the overcoat coating film is 70 or less, and the film thickness T of the overcoat coating film is 13 μm or less.

18. The coated metal sheet according to claim 13, wherein the value L of the overcoat coating film is more than 80, and the film thickness T of the overcoat coating film is 15 μm or more.

19. The coated metal sheet according to claim 13, wherein the absolute value ΔL of the difference between the value L of the overcoat coating film and the value L of the color of the surface of the metal sheet before the overcoat coating film is formed is 10 or less, and the film thickness T of the overcoat coating film is 11 μm or less.

20. The coated metal sheet according to claim 13, wherein the absolute value ΔL of the difference between the value L of the overcoat coating film and the value L of the color of the surface of the metal sheet before the overcoat coating film is formed is 20 or less, and the film thickness T of the overcoat coating film is 13 μm or less.

21. The coated metal sheet according to claim 13, wherein the absolute value ΔL of the difference between the value L of the overcoat coating film and the value L of the color of the surface of the metal sheet before the overcoat coating film is formed is 50 or less, and the film thickness T of the overcoat coating film is 15 μm or less.

22. The coated metal sheet according to claim 13, having a glossiness at 60° of 20 to 85.

23. The coated metal sheet according to claim 13, wherein the coated metal sheet is a coated metal sheet for exterior.

24. An exterior building material composed of the coated metal sheet according to claim 13.

25. The exterior building material according to claim 24, further comprising one or more selected from the group consisting of members to fix the exterior building material to a building, members to connect the exterior building material(s) to one another, marks that show the direction of the exterior building material on mounting, and foam sheets or foam layers to improve thermal insulation properties.

* * * * *